United States Patent
Tsuchiya et al.

(10) Patent No.: US 10,968,587 B2
(45) Date of Patent: Apr. 6, 2021

(54) PNEUMATIC FENDER

(71) Applicant: THE YOKOHAMA RUBBER CO., LTD., Tokyo (JP)

(72) Inventors: Kouko Tsuchiya, Hiratsuka (JP); Minami Shibuya, Hiratsuka (JP); Keiichi Hasegawa, Hiratsuka (JP); Gang Hou, Hiratsuka (JP); Satoshi Shibayama, Hiratsuka (JP); Akihiro Iemoto, Hiratsuka (JP); Shunichi Ono, Hiratsuka (JP); Michito Kaneko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/629,695

(22) PCT Filed: Jun. 7, 2018

(86) PCT No.: PCT/JP2018/021809
§ 371 (c)(1),
(2) Date: Jan. 9, 2020

(87) PCT Pub. No.: WO2019/012871
PCT Pub. Date: Jan. 17, 2019

(65) Prior Publication Data
US 2020/0399847 A1    Dec. 24, 2020

(30) Foreign Application Priority Data

Jul. 12, 2017 (JP) ............... JP2017-136212

(51) Int. Cl.
E02B 3/26 (2006.01)

(52) U.S. Cl.
CPC ................... *E02B 3/26* (2013.01)

(58) Field of Classification Search
CPC ...... E02B 3/26; B63B 59/02; B63B 2059/025
See application file for complete search history.

(56) References Cited

U.S. PATENT DOCUMENTS 9,365,992 B2    6/2016    Yamada et al.
9,499,243 B2    11/2016   Sakakibara et al.

FOREIGN PATENT DOCUMENTS

| JP | 2-289714       | * 11/1990 |
| JP | 2013-231297 A  |   11/2013 |
| JP | 2014-218866 A  |   11/2014 |

\* cited by examiner

*Primary Examiner* — Sunil Singh
(74) *Attorney, Agent, or Firm* — Carrier Blackman & Associates, P.C.; Joseph P. Carrier; William D. Blackman (57) ABSTRACT

In a pneumatic fender, reinforcing layers of a body portion and reinforcing layers of a predetermined range in the longitudinal direction of a fender near a boundary between each hemispherical portion and the body portion are formed by aligning cords of reinforcing layers of the body portion and that of the predetermined range in parallel, and in a neutral state without expansion, the cords of the reinforcing layers of the body portion meet each other and the cords of the reinforcing layers of the predetermined range meet each other, and cord angles A and B are each set to from 15° to 45° with respect to the longitudinal direction of the fender. When the interior of the fender is set to a specified internal pressure, the cord angles A and B increase to extent of a static angle, and the body portion and the predetermined range expand.

5 Claims, 6 Drawing Sheets

PNEUMATIC FENDER

TECHNICAL FIELD

The present invention relates to a pneumatic fender, and particularly relates to a pneumatic fender that can expand more greatly during use than when the pneumatic fender is not in use, such as when stored, transported, or the like, and that can correct distortion at or near a boundary between the body portion and each of the hemispherical portions at both ends to expand an overall shape more similarly than in the related art.

BACKGROUND ART

A pneumatic fender generally includes hemispherical portions each having a bowl shape at both ends of a body portion having a cylindrical shape, and the body portion is configured by layering a plurality of reinforcing layers between an inner layer rubber and an outer layer rubber. Each of the plurality of reinforcing layers is a cord layer formed by aligning a number of cords in parallel, and the cords are disposed at a predetermined cord angle with respect to the longitudinal direction of the fender (cylinder axial direction). The cords of the reinforcing layers layered adjacent to each other meet each other and are disposed. Since the cord angle is set to the extent of a static angle (from 54° to 55°) in a neutral state without expansion, a size (length and outer diameter) does not change so much even when the interior of the fender is filled with air to be set to a specified internal pressure.

On the other hand, there is proposed a pneumatic fender in which a cord angle of a reinforcing layer in a body portion is set to from 15° to 45° in a neutral state (see Patent Document 1). In this fender proposed, when the interior of the fender is filled with air to be set to a specified internal pressure, the cord angle of the reinforcing layer tends to increase to a static angle. Accordingly, since the body portion is more greatly enlarged in diameter and expands, the fender is compact when the fender is not in use, while excellent cushioning performance (counter force) can be obtained during use.

However, unlike the reinforcing layer of the body portion, a reinforcing layer of a hemispherical portion does not have specifications in which a cord angle is set to from 15° to 45° in the neutral state. Thus, even when the interior of the fender is set to a specified internal pressure, the hemispherical portion is not enlarged in diameter as greatly as the body portion. Accordingly, when the interior of the fender is expanded to a specified internal pressure, distortion occurs at or near a boundary between the body portion and each of the hemispherical portions at both ends, and the fender tends to have an unstable shape.

CITATION LIST

Patent Literature

Patent Document 1: JP 2013-231297 A

SUMMARY OF INVENTION

Technical Problem

It is an object of the present invention to provide a pneumatic fender that can expand more greatly during use than when the pneumatic fender is not in use, such as when stored, transported, or the like, and that can correct distortion at or near a boundary between the body portion and each of the hemispherical portions at both ends to expand an overall shape more similarly than in the related art.

Solution to Problem

To achieve the above object, a pneumatic fender according to an embodiment of the present invention includes: hemispherical portions each having a bowl shape at both ends of a body portion having a cylindrical shape; the body portion and the respective hemispherical portions being configured by layering a plurality of reinforcing layers between an inner layer rubber and an outer layer rubber; a reinforcing layer of the plurality of reinforcing layers of the body portion is a cord layer formed by aligning a number of cords in parallel; the cords of the reinforcing layers layered adjacent to each other meeting and being disposed at a predetermined cord angle with respect to a longitudinal direction of the fender and in a neutral state without expansion the cord angle is set to from 15° to 45°; wherein a predetermined range in the longitudinal direction of the fender in the reinforcing layers constituting each of the hemispherical portions near a boundary with the body portion is a cord layer formed by aligning a number of cords in parallel, and the cords of the reinforcing layers layered adjacent to each other meet and are disposed at a predetermined cord angle with respect to the longitudinal direction of the fender and in the neutral state the cord angle is set to from 15° to 45°.

Advantageous Effects of Invention

According to an embodiment of the present invention, not only in the reinforcing layers constituting the body portion, but also in a predetermined range in the reinforcing layers constituting each of the hemispherical portions near the boundary with the body portion, cords of the reinforcing layers layered adjacent to each other meet each other, and in a neutral state without expansion, a cord angle is set from 15° to 45° with respect to the longitudinal direction of the fender. Accordingly, when the fender is filled with air to be set to a specified internal pressure, the cord angle tends to increase to a stable static angle, and thus, the body portion and the predetermined range of the hemispherical portion consecutive to the body portion can be enlarged greatly in diameter and expanded. Thus, the fender can be expanded more greatly during use than when the fender is not in use, such as when stored, transported, or the like, and can correct distortion at or near a boundary between the body portion and each of the hemispherical portions at both ends. In addition, the overall shape of the fender can be expanded more similarly than in the related art.

DESCRIPTION OF EMBODIMENTS

A pneumatic fender according to embodiments of the present invention will be described below with reference to embodiments illustrated in the figures.

As illustrated in FIGS. 1 to 5, a pneumatic fender 1 according to an embodiment of the present invention (hereinafter referred to as a fender 1) includes hemispherical portions 4 each having a bowl shape at both ends of a body portion 2 having a cylindrical shape. In this embodiment, a mouthpiece portion 9 is provided in one of the hemispherical portions 4, but may be provided in both of the hemispherical portions 4. One dot chain line CL in the figure is a center line of the fender 1 passing through the circular center of each of the hemispherical portions 4.

The body portion 2 is configured by layering a plurality of reinforcing layers 3 between an inner layer rubber 6 and an outer layer rubber 7. Each of the hemispherical portions 4 is also configured by layering a plurality of reinforcing layers 5 between the inner layer rubber 6 and the outer layer rubber 7. Each of the hemispherical portions 4 includes a predetermined range 4A in the longitudinal direction of the fender near a boundary with the body portion 2, and an end portion range 4B that is the range other than the predetermined range 4A. Longitudinal direction of the fender refers to a direction parallel to the center line CL of the fender 1.

Figure 1:
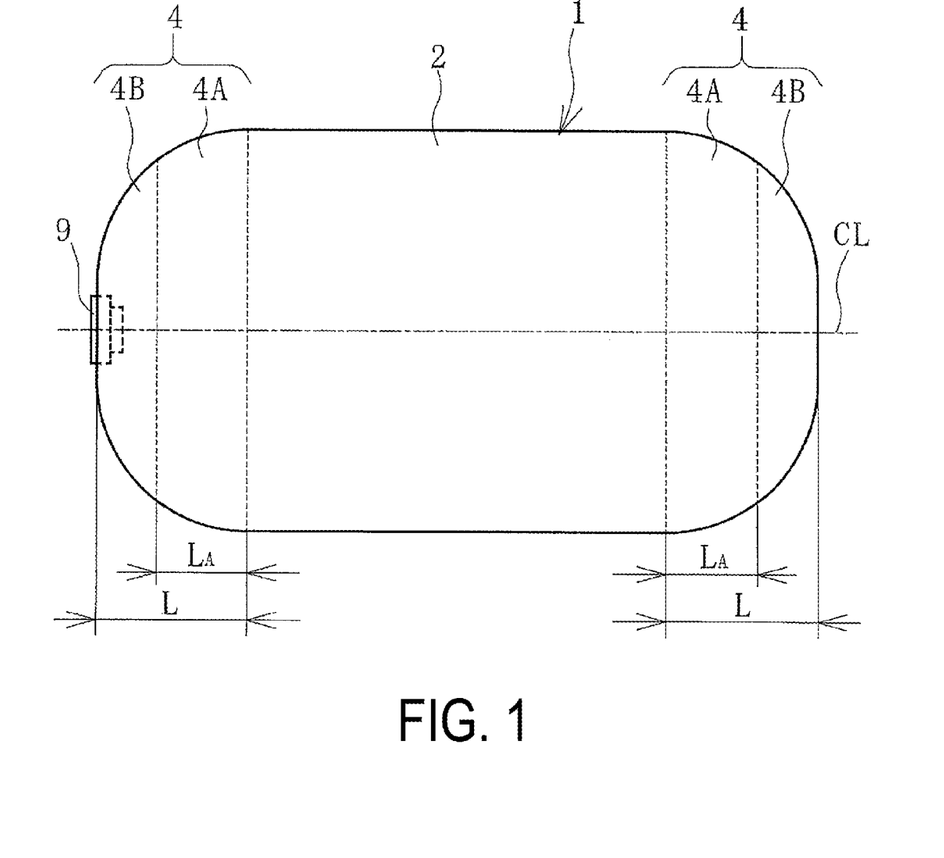
FIG. 1 is an explanatory view illustrating a pneumatic fender according to an embodiment of the present invention in a neutral state without expansion as viewed from the side.
Figure 2:
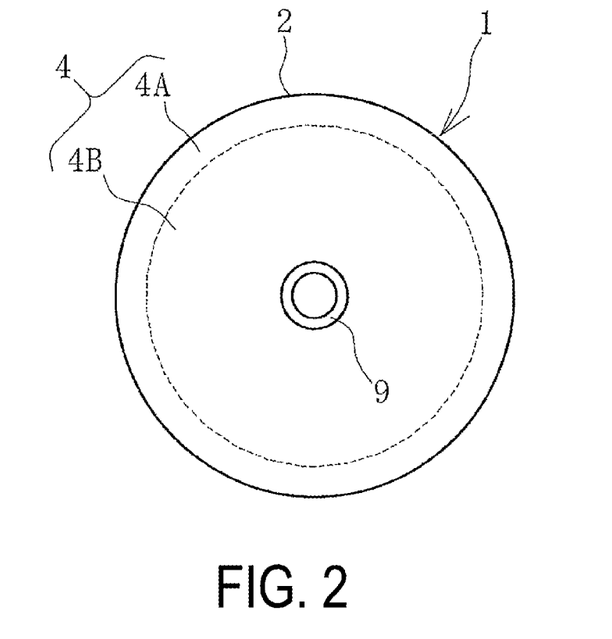
FIG. 2 is an explanatory view illustrating the pneumatic fender of FIG. 1 in a front view.
Figure 3:
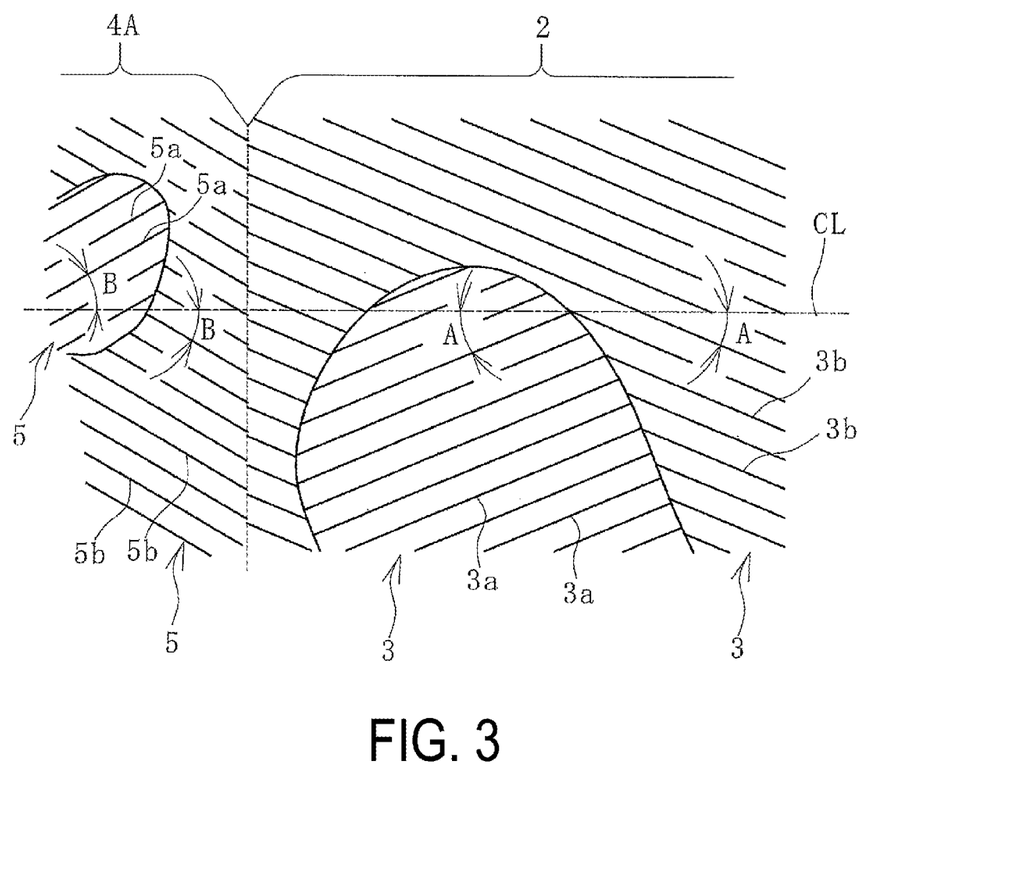
FIG. 3 is an explanatory view illustrating a state of a reinforcing layer in a body portion and in a predetermined range of a hemispherical portion of FIG. 1, with a portion being cut away and enlarged.

Each of the reinforcing layers 3 of the body portion 2 is a cord layer formed by aligning a number of cords 3a and 3b in parallel. The cords 3a and 3b of the reinforcing layers 3 layered adjacent to each other meet each other and are disposed at a cord angle A predetermined with respect to the longitudinal direction of the fender. That is, the reinforcing layers 3 of a first layer, a third layer, and a fifth layer disposed inwardly are disposed at the cord angle A in the same direction, and the reinforcing layers 3 of a second layer, a fourth layer, and a sixth layer disposed inwardly are disposed at the cord angle A in the same direction, and this cord angle A is in the opposite direction to the direction in the first layer, the third layer, and the fifth layer. In this manner, a reinforcing layer group of the body portion 2 includes a so-called bias structure. In a neutral state where the fender 1 is not expanded, the cord angle A is set to from 15° to 45°.

As the cord 3a and 3b, a steel cord, an organic fiber cord or the like are used. The wire diameter of each of the cords 3a and 3b is, for example, from about 0.5 mm to about 1.5 mm.

The specifications of the reinforcing layers 5 of each of hemispherical portions 4 differ between the predetermined range 4A and the end portion range 4B. Each of the reinforcing layers 5 in the predetermined range 4A is a cord layer formed by aligning a number of cords 5a and 5b in parallel. In addition, the cords 5a and 5b of the reinforcing layers 5 layered adjacent to each other meet each other and are disposed at a cord angle B predetermined with respect to the longitudinal direction of the fender. A reinforcing layer group in the predetermined range 4A also includes a so-called bias structure. When the fender 1 is in the neutral state, the cord angle B is set to from 15° to 45°.

Figure 4:
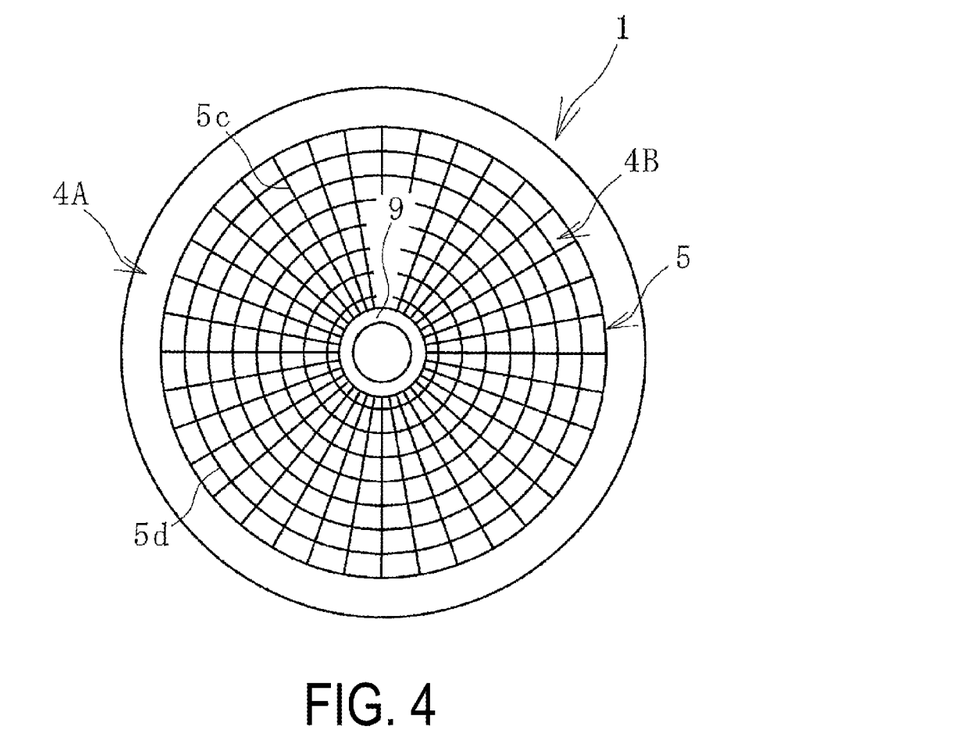
FIG. 4 is an enlarged explanatory view illustrating a state of a reinforcing layer in an end portion range of a hemispherical portion of FIG. 2.

Each of the reinforcing layers 5 of the end portion range 4B is formed by alternately layering, for example, a cord layer formed of a cord 5c extending radially from the circular center of the hemispherical portion 4 and a cord layer formed of a cord 5d extending in the circumferential direction. That is, a reinforcing layer group of the end portion range 4B includes a so-called radial structure that differs from the bias structure of the predetermined range 4A. Note that in the figure, a boundary between the body portion 2 and the predetermined range 4A of the hemispherical portion 4, and a boundary between the predetermined range 4A and the end portion range 4B of the hemispherical portion 4 are illustrated by a thin broken line and are linearly partitioned, but actually, at each boundary, the respective reinforcing layers overlap to some extent and are not necessarily linearly partitioned.

Neutral state in an embodiment of the present invention refers to a state in which tension is substantially not generated in the cords 3a, 3b, 5a, 5b, 5c, and 5d, and air is injected into the interior of the fender 1, but the internal pressure of the fender 1 is slightly higher than the atmospheric pressure (for example, 10 kPa), and refers to a state in which the body portion 2 retains a cylindrical shape and the hemispherical portions 4 each retain a bowl shape.

The reinforcing layers 3 of the body portion 2 and the reinforcing layers 5 of the predetermined range 4A can have the same cord specifications (wire diameter, material), the same arrangement pitch, and the same cord angles A and B, but at least one of these can also differ. From the viewpoint of material management, the cords 3a and 3b and the cords 5a and 5b preferably have the same specifications.

The cords 5a and 5b of the reinforcing layer 5 in the predetermined range 4A and the cords 5c and 5d of the reinforcing layer 5 in the end portion range 4B can have the same specifications (wire diameter, material), but can also have different specifications. From the viewpoint of material management, the cords 5a and 5b and the cords 5c and 5d preferably have the same specifications.

Figure 5:
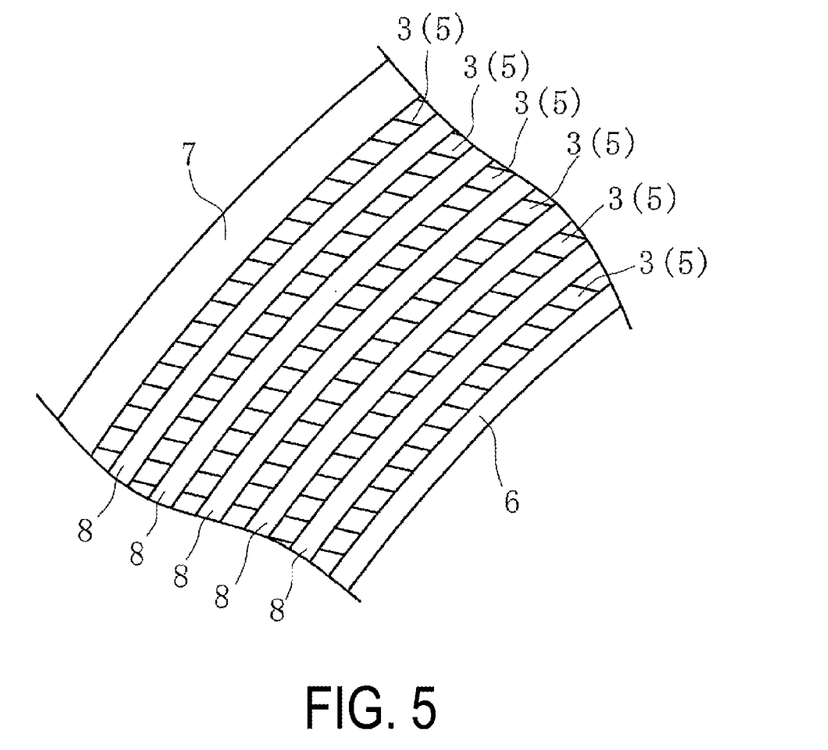
FIG. 5 is an explanatory view illustrating a layered state of the reinforcing layer of FIG. 3 in a cross-sectional view.

As illustrated in FIG. 5, an intermediate rubber layer 8 having an appropriate thickness is interposed between the reinforcing layers 3 layered and between the reinforcing layers 5 layered. In this embodiment, six reinforcing layers 3 constituting the body portion 2 are layered and six reinforcing layers 5 constituting the hemispherical portions 4 are layered, but the number of the reinforcing layers 3 and the number of the reinforcing layers 5 are each set to, for example, from 4 to 12. Note that the number of the reinforcing layers 3 and the number of the reinforcing layers 5 are basically set to be the same.

Figure 6:
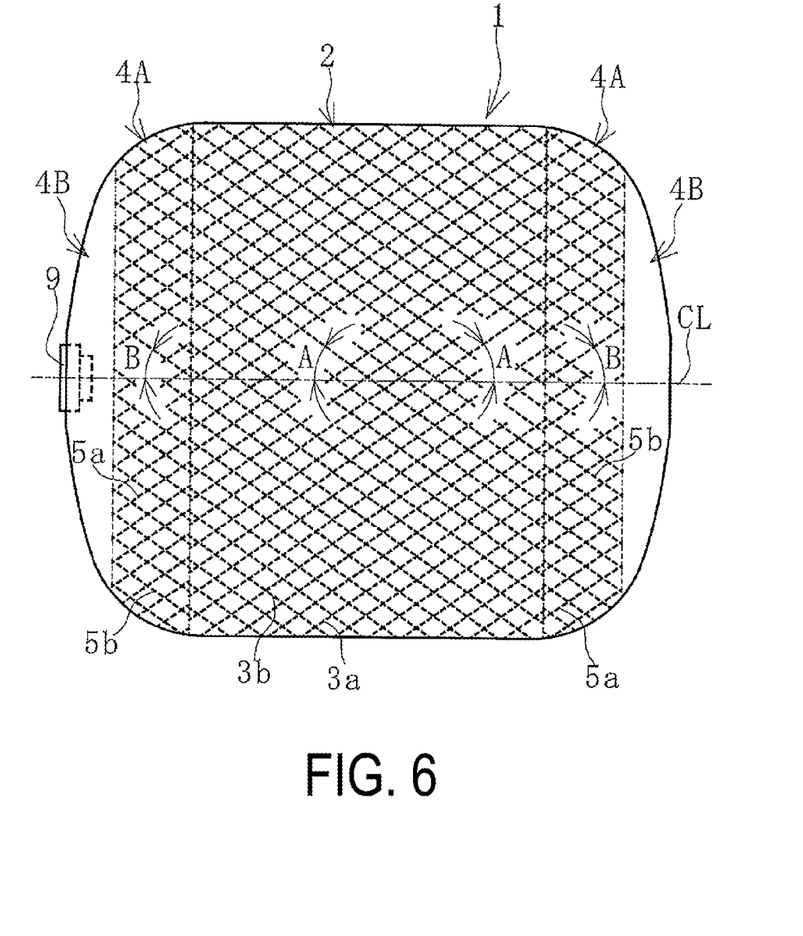
FIG. 6 is an explanatory view illustrating, in a side view, a state of a reinforcing layer in a body portion and in a predetermined range of a hemispherical portion of the pneumatic fender of FIG. 1 expanded at a specified internal pressure.

When the fender 1 is not in use, such as when stored, transported, or installed, the internal pressure of the fender 1 is set to a low pressure of, for example, about 10 kPa to keep the fender 1 in the neutral state without expansion. Alternatively, the inside air is discharged and the fender 1 is folded. When the fender 1 is actually installed and used at an installation site, the fender 1 is expanded as illustrated in FIG. 6 by filling the interior of the fender 1 with air through a valve installed in the mouthpiece portion 9 to be set to a specified internal pressure. The specified internal pressure is, for example, from about 50 kPa to about 100 kPa. In FIG. 6, the cords 3a and 3b of the reinforcing layers 3 constituting the body portion 2 and the cords 5a and 5b of the reinforcing layers 5 constituting the predetermined range 4A of the hemispherical portion 4 are illustrated by thick broken lines.

In a process of filling the interior of the fender 1 with air to set the interior of the fender 1 to the specified internal pressure, the cord angle A of each of the cords 3a and 3b of the respective reinforcing layers 3 in the body portion 2 tends to increase to the extent of a stable static angle (from 54° to 55°). At this time, each intermediate rubber layer 8 is subjected to appropriate shear deformation, and the cord angle A changes to the extent of a static angle, and thus the body portion 2 can be enlarged more greatly in diameter and expanded during use. For example, the outer diameter of the body portion 2 can be set to from about 120% to about 200% of the outer diameter in the neutral state during use with expansion. The size of the body portion 2 in the longitudinal direction of the fender is from about 60% to about 95% of the size in the neutral state during use with expansion.

Even in the predetermined range 4A, in a process of filling the interior of the fender 1 with air to set the interior of the fender 1 to the specified internal pressure, the cord angle B of each of the cords 5a and 5b of the respective reinforcing layers 5 tends to increase to the extent of a stable static angle (from 54° to 55°). At this time, each intermediate rubber layer 8 is subjected to appropriate shear deformation, and the cord angle B changes to the extent of a static angle, and thus the predetermined range 4A can be enlarged more greatly in diameter and expanded during use. Since the reinforcing layer group of the end portion range 4B of the hemispherical portion 4 is not of a bias structure, even when the fender 1 is filled with air to be set to a specified internal pressure, the shape of the end portion range 4B of the hemispherical portion 4 does not greatly deform with respect to the neutral state as in the case of the body portion 2 or the predetermined range 4A.

Accordingly, it is only required that the layer thickness of the intermediate rubber layer 8 is determined within the range in which the body portion 2 and the predetermined range 4A can be enlarged in diameter smoothly and expanded when the fender 1 is set to a specified internal pressure. When a kind of rubber that is easily shear-deformed is employed for the intermediate rubber layer 8, the layer thickness of the intermediate rubber layer 8 can be reduced.

When the cord angles A and B in the neutral state are less than 15°, to increase the cord angle A to the extent of a static angle, excessive shear stress is generated in the intermediate rubber layer 8, and thus this is not preferable. When the cord angles A and B are more than 45°, the degree of diameter enlargement of the body portion 2 and the predetermined range 4A of the hemispherical portion 4 in expansion from the neutral state to the specified internal pressure becomes smaller. In other words, when the cord angles A and B are more than 45°, the outside diameter of the fender 1 when the fender 1 is not in use does not become so small.

According to an embodiment of the present invention, when the fender 1 is filled with air to be set to a specified internal pressure, the cord angles A and B tend to increase to a stable static angle, and thus the body portion 2 and the predetermined range 4A of the hemispherical portion 4 continuous to the body portion 2 can be enlarged greatly in diameter and expanded. Thus, the fender 1 can be expanded more greatly during use, while the fender 1 is compact when the fender 1 is not in use, such as when stored, transported, or the like.

When the fender 1 is not in use, the fender 1 is compact, and thus a space for storing the fender 1 can be reduced. Further, to carry the fender 1 to an installation site, it is not required to prepare a large carrying ship or a transportation vehicle, and a crane device for lifting the fender 1 does not need to be large. Since it becomes easy to move the fender 1 when the fender 1 is transported, installed, or the like, work is reduced. During use of the fender 1, the fender 1 expands more greatly, and thus this is advantageous in improving cushioning performance (counter force that can be obtained when a marine vessel comes alongside a vessel).

In addition, according to an embodiment of the present invention, as compared with the related art in which the reinforcing layer group in the predetermined range 4A is not of a bias structure, distortion at or near a boundary (predetermined range 4A) between the body portion 2 and each of the hemispherical portions 4 at both ends in expansion is corrected, and thus the overall shape of the fender 1 can be expanded easily to a shape as set. Specifically, in the case of the fender in the related art, even when the fender is expanded at a specified internal pressure, the entire hemispherical portion does not largely deform, and the body portion more greatly expands, and thus the fender is likely to have an elliptical spherical shape (rugby ball shape).

On the other hand, in an embodiment of the present invention, since the predetermined range 4A of the hemispherical portion 4 expands greatly like the body portion 2, the overall shape of the fender 1 becomes similar between when in the neutral state (state of FIG. 1) and when in the state with expansion at the specified internal pressure (state of FIG. 6). Specifically, when a change in a ratio between the size in the longitudinal direction of the fender and the outer diameter of the body portion 2 is ignored, the shape of the fender is close to a similar shape. When the fender 1 can be expanded in a similar manner as described above, analysis work and the like for simulating cushioning performance (counter force) of the fender 1 can be simplified, and this is also advantageous in increasing prediction accuracy. Further, since the predetermined range 4A expands like the body portion 2, a straight body portion in a state where the fender 1 is expanded becomes longer than the related art, and efficiency of compression elasticity improves (large counter force is easily obtained).

Although the cord angle A and the cord angle B in the neutral state can be set to the same angle, the cord angle A is preferably set smaller than the cord angle B. Such a setting is used, and thus when the fender 1 is set to a specified internal pressure from the neutral state, the body portion 2 is more easily expanded than the predetermined range 4A of the hemispherical portion 4, and this is advantageous in achieving a stable shape. For example, a difference between the cord angle A and the cord angle B in the neutral state is set to from 3° to 15°. Alternatively, the cords 5a and 5b of the reinforcing layers 5 in the predetermined range 4A can be made different in at least one of the wire diameter, the material, or the arrangement pitch from the reinforcing layers 3 of the body portion 2, and the body portion 2 can be designed to more easily expand and deform than the predetermined range 4A of the hemispherical portion 4.

In the fender 1 in the neutral state, a length $L_A$ in the longitudinal direction of the fender of the predetermined range 4A is, for example, from 20% to 90%, more preferably from 50% to 90% of a length L in the longitudinal direction of the fender of the hemispherical portion 4. When the length $L_A$ of the predetermined range 4A is less than 20% of the length L of the hemispherical portion 4, it becomes difficult to sufficiently correct distortion at or near the boundary (predetermined range 4A) between the body portion 2 and each of the hemispherical portions 4 at both ends when the fender 1 is expanded. On the other hand, when the length $L_A$ of the predetermined range 4A exceeds 90% of the length L of the hemispherical portion 4, there is a problem such as difficulty in the production of the fender 1.

The outer diameter of the body portion 2 in the neutral state is not particularly limited, but is, for example, from about 3 m to about 5 m. This degree of the outer diameter makes handling of the fender 1 relatively easy when the fender 1 is not in use, such as when stored, transported, or the like.

REFERENCE SIGNS LIST

1 Pneumatic fender
2 Body portion
3 Reinforcing layer
3a, 3b Cord
4 Hemispherical portion
4A Predetermined range
4B End portion range
5 Reinforcing layer
5a, 5b, 5c, 5d Cord
6 Inner layer rubber
7 Outer layer rubber
8 Intermediate rubber layer
9 Mouthpiece portion

The invention claimed is:

1. A pneumatic fender comprising
hemispherical portions each having a bowl shape at both ends of a body portion having a cylindrical shape; wherein
the body portion and the respective hemispherical portions each being configured by layering a plurality of reinforcing layers between an inner layer rubber and an outer layer rubber;
each said reinforcing layer of the plurality of reinforcing layers of the body portion is a cord layer including a number of cords aligned in parallel to each other and being disposed at a predetermined cord angle with respect to a longitudinal direction of the fender, and in a neutral state without expansion the predetermined cord angle being set to from 15° to 45°;
the cords of adjacent ones of the reinforcing layers in a layering direction of the body portion being inclined in different directions with respect to a longitudinal direction of the fender;
within a predetermined range in the longitudinal direction of the fender near a boundary with the body portion each said reinforcing layer of the plurality of the reinforcing layers constituting each of the hemispherical portions is a cord layer including a number of cords aligned in parallel to each other and being disposed at a predetermined cord angle with respect to a longitudinal direction of the fender, and in a neutral state without expansion the predetermined cord angle being set to from 15° to 45°,
the cords of adjacent ones of the reinforcing layers in a layering direction within the predetermined range of each of the hemispherical portions being inclined in different directions with respect to the longitudinal direction of the fender, and
the cord angle in the neutral state of the reinforcing layer constituting the body portion is set smaller than the cord angle in the neutral state of the reinforcing layer in the predetermined range of each of the hemispherical portions.

2. The pneumatic fender according to claim 1, wherein a difference between the cord angle in the neutral state of the reinforcing layer constituting the body portion and the cord angle in the neutral state of the reinforcing layer in the predetermined range of each of the hemispherical portions is set to be from 3° to 15°.

3. The pneumatic fender according to claim 2, wherein a number of the reinforcing layers constituting the body portion and the number of the reinforcing layers in the predetermined range of each of the hemispherical portions are each from 4 to 12.

4. The pneumatic fender according to claim 1, wherein a number of the reinforcing layers constituting the body portion and the number of the reinforcing layers in the predetermined range of each of the hemispherical portions are each from 4 to 12.

5. The pneumatic fender according to claim 1, wherein a length of the predetermined range in the longitudinal direction of the fender is from 20% to 90% of a length in the longitudinal direction of the fender of each of the corresponding hemispherical portions.

* * * * *